US012759698B2

(12) United States Patent
Eddy et al.

(10) Patent No.: US 12,759,698 B2
(45) Date of Patent: Oct. 13, 2026

(54) EMERGENCY AUTOLAND BRAKING SYSTEM

(71) Applicant: Textron Aviation Inc., Wichita, KS (US)

(72) Inventors: Stephen M. Eddy, Derby, KS (US); Robert Glynn Wiegers, Wichita, KS (US); Michael Troy Heeren, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 19/037,598

(22) Filed: Jan. 27, 2025

(65) Prior Publication Data

US 2025/0242910 A1 Jul. 31, 2025

Related U.S. Application Data

(60) Provisional application No. 63/625,335, filed on Jan. 26, 2024.

(51) Int. Cl.

| | |
|---|---|
| ***B64C 25/44*** | (2006.01) |
| ***B64C 13/04*** | (2006.01) |
| ***B64C 13/30*** | (2006.01) |
| *B64C 25/48* | (2006.01) |

(52) U.S. Cl.

CPC ............ *B64C 25/44* (2013.01); *B64C 13/044* (2018.01); *B64C 13/30* (2013.01); *B64C 25/48* (2013.01)

(58) Field of Classification Search

CPC ....... B64C 25/426; B64C 25/44; B64C 25/46; B64C 25/48; B64C 13/044; B64C 13/30; B64C 13/32; B60T 8/325

See application file for complete search history.

(56) References Cited

U.S. PATENT DOCUMENTS

| | | | | | |
|---|---|---|---|---|---|
| 1,763,405 | A * | 6/1930 | Messier | B64C 25/445 | 244/111 |
| 1,782,524 | A * | 11/1930 | Weaver | B64C 25/48 | 244/235 |
| 2,002,006 | A * | 5/1935 | Hall | B64C 25/48 | 244/111 |
| 2,336,891 | A * | 12/1943 | Schnell | B64C 25/48 | 244/50 |
| 2,476,610 | A * | 7/1949 | Linscott | B64C 25/42 | 244/102 R |
| 2,764,371 | A * | 9/1956 | Armstrong | B64C 25/42 | 244/81 |
| 3,129,605 | A * | 4/1964 | Bonnell, Jr. | B64C 13/044 | 244/235 |
| 5,060,889 | A * | 10/1991 | Nadkarni | G05D 1/0204 | 701/16 |
| 9,227,608 | B2 | 1/2016 | Hill et al. | | |

(Continued)

*Primary Examiner* — Richard Green

(74) *Attorney, Agent, or Firm* — Avek IP, LLC

(57) ABSTRACT

An emergency autoland braking system for aircraft includes an electromechanical actuator configured to provide a braking force to rudder pedals for actuating a braking system without altering the existing braking system of the aircraft. An equalized braking force may be applied to both rudder pedals via a force balancing mechanism and a single linear actuator, or differential braking force may be applied via independent linear actuators. The system is compatible with both open and closed loop control for commanding a braking force.

11 Claims, 7 Drawing Sheets

(56) References Cited

U.S. PATENT DOCUMENTS

| | | | |
|---|---|---|---|
| 9,656,641 | B2 | 5/2017 | Griffith et al. |
| 10,259,435 | B2 * | 4/2019 | Georgin ................ B64C 25/426 |
| 10,442,529 | B2 | 10/2019 | Dupre et al. |

* cited by examiner

EMERGENCY AUTOLAND BRAKING SYSTEM

CROSS-REFERENCE TO RELATED APPLICATIONS

This application claims the benefit of priority of U.S. Provisional Patent Application No. 63/625,335, entitled Emergency Autoland Braking System and filed on Jan. 26, 2024, the disclosure of which is herein incorporated by reference in its entirety.

BACKGROUND

1. Field

The disclosed embodiments relate generally to the field of autonomous vehicle control. More specifically, the disclosed embodiments are related to automatic braking for emergency autoland systems in aircraft.

2. Related Art

Emergency autoland braking systems for aircraft have been described in the past; however, they generally use actuators acting directly on additional hydraulic master cylinders in the braking system. U.S. Pat. No. 10,422,529 to Dupre et al. discloses a system for controlling a lateral trajectory of an aircraft and includes actuators connected to the rudder pedals; however, the actuators described are used for providing haptic feedback to the pilot. U.S. Pat. No. 9,227,608 to Hill et al. discloses a decentralized electric brake system, known as brake-by-wire, and includes electric actuators used to actuate the mechanical braking system at the aircraft brake assembly. U.S. Pat. No. 9,656,641 to Griffith et al. discloses an aircraft electrical brake control system, known as brake-by-wire, and includes electric actuators used to actuate the mechanical braking system at the aircraft brake assembly.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In certain embodiments, an emergency autoland braking system for aircraft includes: a cable having a first end and a second end; a first cam operatively coupled to the first end of the cable, wherein the first cam is configured to rotate via pulling of the cable thereby actuating a left brake arm; a second cam operatively coupled to the second end of the cable, wherein the second cam is configured to rotate via pulling of the cable thereby actuating a right brake arm; a pulley, wherein the cable is routed through the pulley; and a linear actuator operatively coupled to the pulley for adjusting a position of the pulley, wherein actuation of the linear actuator applies equal tension to the first and second ends of the cable via the pulley thereby adding an equal braking force to the left brake arm and the right brake arm.

In certain embodiments, an emergency autoland braking system for aircraft includes: a first cam configured to rotate for applying force to a left brake arm for actuating a left brake pedal; a second cam configured to rotate for applying force to a right brake arm for actuating a right brake pedal; a first linear actuator operatively coupled to the first cam via a first cable for rotating the first cam; and a second linear actuator operatively coupled to the second cam via a second cable for rotating the second cam independently from the first cam, thereby providing differential autobraking.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
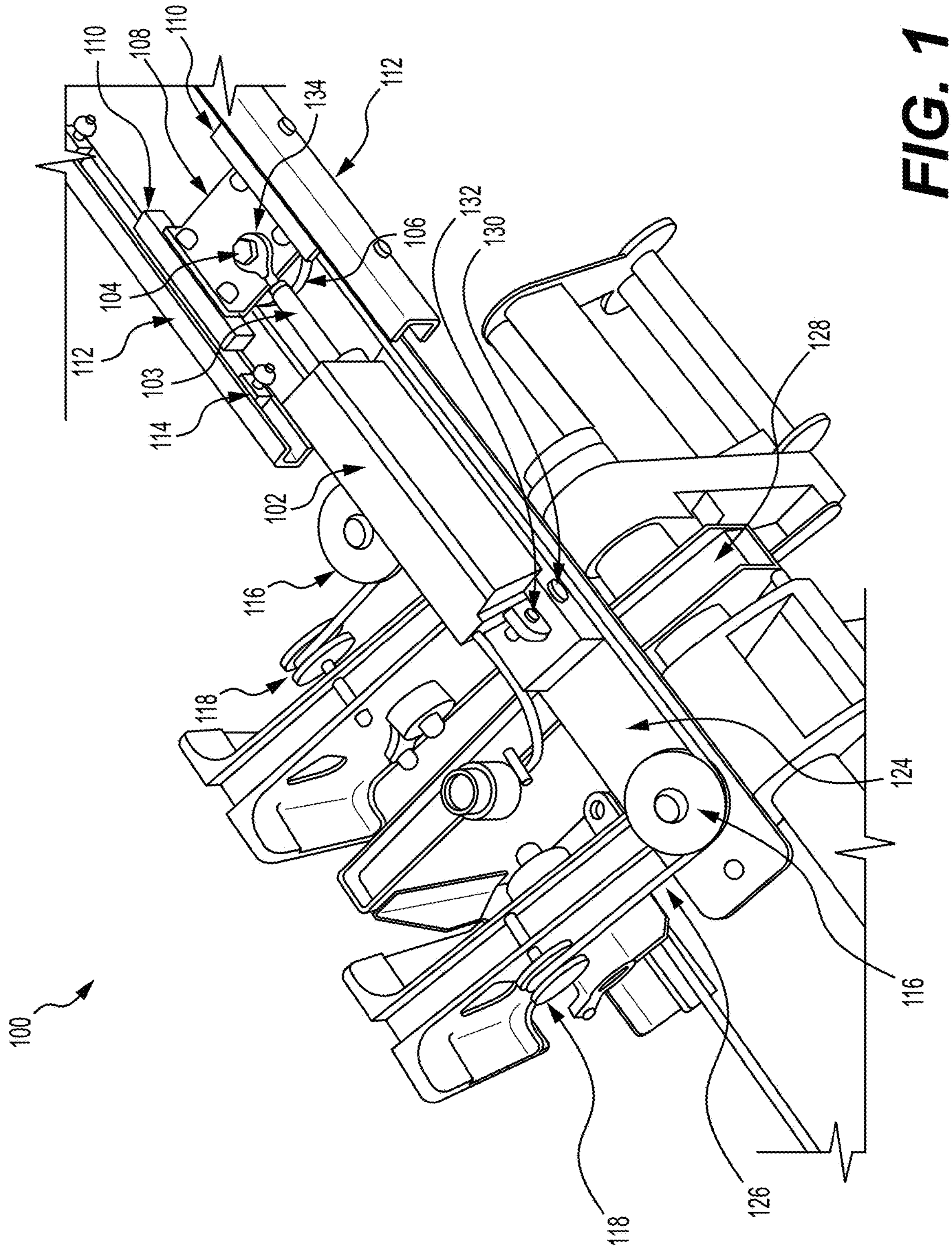
FIG. 1 is a perspective view of an emergency autoland braking system with a single actuator and force equalizing pulley system, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the technology can include a variety of combinations and/or integrations of the embodiments described herein.

With the implementation of emergency autoland systems in aircraft, automatic braking is required during the landing phase to stop the aircraft on the runway. The disclosed embodiments are intended for aircraft with traditional manual or powered hydraulic braking systems, although the disclosed embodiments may be used with electronic brake-by-wire systems without modifying an autoland-digital interface since the servos function on the pedals in the same manner as a pilot. As such, a mechanical input is required at some place in the hydraulic system to engage the metering valve or master cylinders. In an effort to establish the design for multiple different aircraft, in which each different aircraft may have different design aspects, actuation of the copilot rudder pedals directly using an electromechanical actuator(s) minimizes any differences in the design of the system for use on different aircraft. One benefit of such a system is the limited number of actuators versus placing multiple actuators elsewhere in the hydraulic system.

Where differential braking is not required, a single actuator may be used with a force equalizing mechanism which applies equal input force to each of the left and right brake pedals to provide equal braking force to the left and right wheels. Equal braking force does not necessarily translate to equal travel of both toe brakes in the rudder pedals due to several factors. These factors include differences in tire, brake, and runway conditions resulting in the need to travel (actuate) one toe brake further than the other toe brake. For example, in a certain condition, the pilot or emergency autoland braking system may need to actuate the left brake to 50% pedal travel, and the right brake to 40% pedal travel in order to achieve equal brake line pressure and straight line braking of the aircraft. The emergency autoland braking system may use either a simple discrete signal or a proportional command signal from a controller (e.g., an emergency autoland braking controller), based on the needs of the aircraft. Where differential braking is required, two actuators can be used independently on each of the left and right rudder pedals.

The electromechanical actuators are configured to physically move the copilot rudder pedals via pulleys and cables which in turn, provides the braking pressure in the same method as a pilot would. Both single and multiple actuator concepts use a cable mechanism that allows the actuator to depress the pedals but does not interfere with the normal pilot usage when the actuator(s) is not activated. In a single actuator system (non-differential braking) the force applied to the pedals is equalized via a central pulley attached to the actuator. Electrical power is applied in such a way as to control the actuator at full speed or a controlled speed. The actuator will actuate the brake pedals sufficiently to provide the required braking or to a maximum braking force with anti-skid system engagement. The system may be operated with open loop control or closed loop control based on the specific implementation. For example, open loop operation may simply apply maximum braking force to intentionally engage the anti-skid system, allowing the anti-skid system to fully decelerate and stop the aircraft. One example of closed loop operation is having a controller provide a command signal to an actuator for apply a proportional braking force based on input from various sensors on the aircraft including wheel speed sensors, longitudinal acceleration, airspeed, altitude, etc., in order to slow the aircraft as quickly and safely as possible without skidding the tires. The controller is for example a computer or microcontroller having software stored in memory and a processor configured to execute commands/instructions provided by the software. The system may also be implemented using any other method of mechanical force/torque transmission to the brake pedals, for example via push/pull rods.

FIG. 1 shows a perspective view of an emergency autoland braking system with a single actuator and force equalizing pulley system 100. The fixed end of an electromechanical linear actuator 102 is mounted to a baseplate 124 via a shear bolt 130 which passes through a spherical bearing 132, with the spherical bearing 132 being constrained within the housing of the linear actuator 102. The acting end of the linear actuator 102 is mounted to a driven sled 108 via a shear bolt 104 which passes through a rod end 134. The rod end 134 is threaded into a linear shaft portion 103 of the acting end of the linear actuator 102. A pulley 106 is also bolted to the driven sled 108 via shear bolt 104. The driven sled 108 is attached to one or more linear bearings 110. Multiple attachment methods may be used to attach the linear bearings 110 to the driven sled 108: for example bolts, welding, riveting, or bonding. The linear bearings 110 each travel in corresponding linear rails 112, with the direction of travel being the same as the linear actuator's direction of motion during actuation. Travel limiting stops 114 are affixed to the linear rails 112 to prevent over travel conditions.

Two cable pulleys 116 are mounted to the baseplate 124 such that the axis of rotation of the cable pulleys 116 is perpendicular to both the flat surface of the baseplate 124, as well as the direction of travel of the linear actuator 102. Two additional cable pulleys 118 are mounted to a rudder pedal assembly 128 in a perpendicular orientation to cable pulleys 116, with their rotational axis being parallel to the direction of travel of linear actuator 102. A cable 126 is configured such that it is routed around the pulleys 106, 116, 118, with a first end of the cable 126 attached to a first cam 144 and a second end of the cable 126 terminating at a second cam 145. First cam 144 is configured for actuating a first brake pedal (e.g., a right brake pedal), while the second cam 145 is configured for actuating a second brake pedal (e.g., a left brake pedal).

Figure 2A:
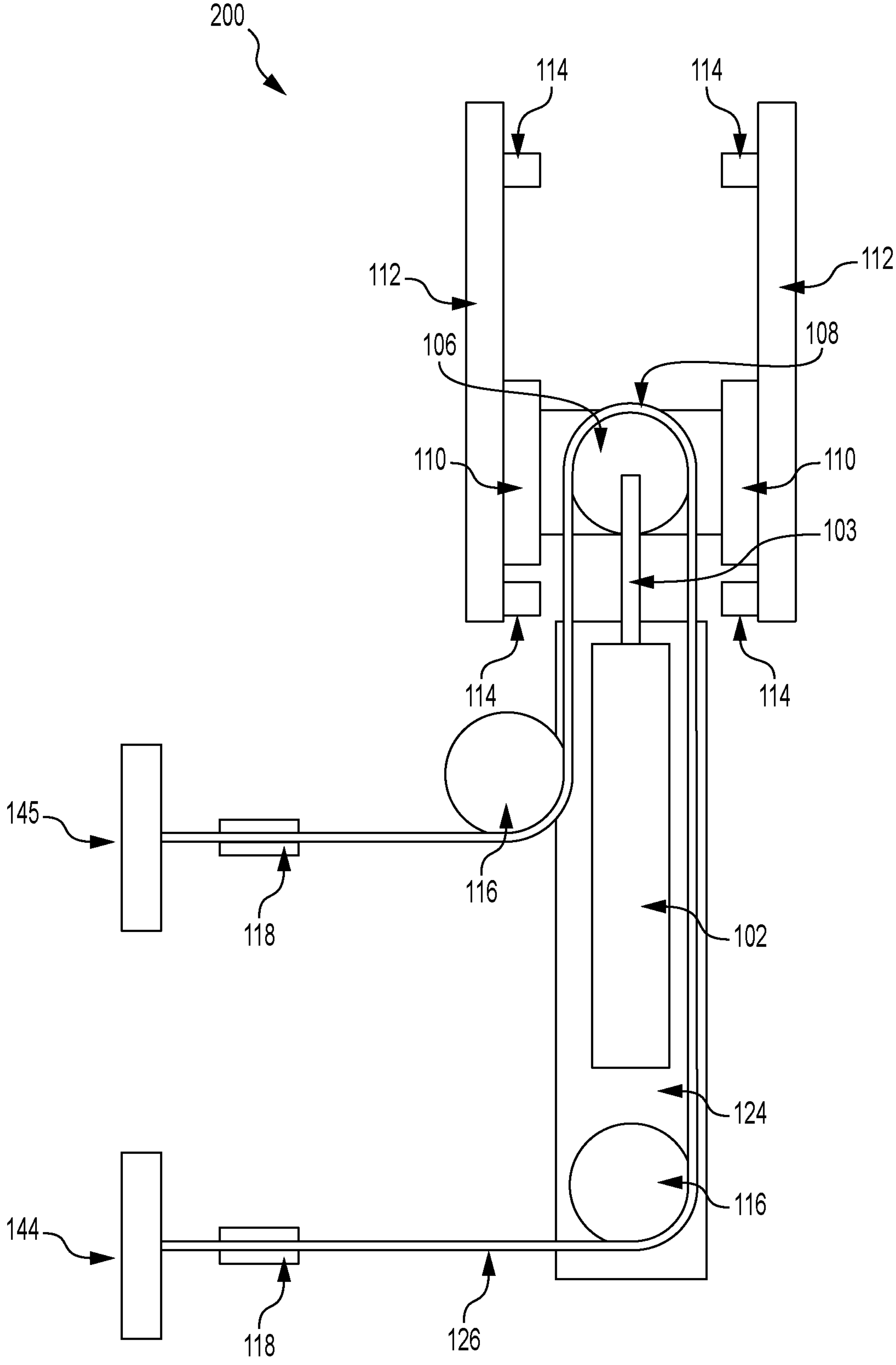
FIG. 2A is a simplified schematic view of some components of the emergency autoland braking system of FIG. 1 illustrating a force equalizing pulley mechanism, in an embodiment.
Figure 2B:
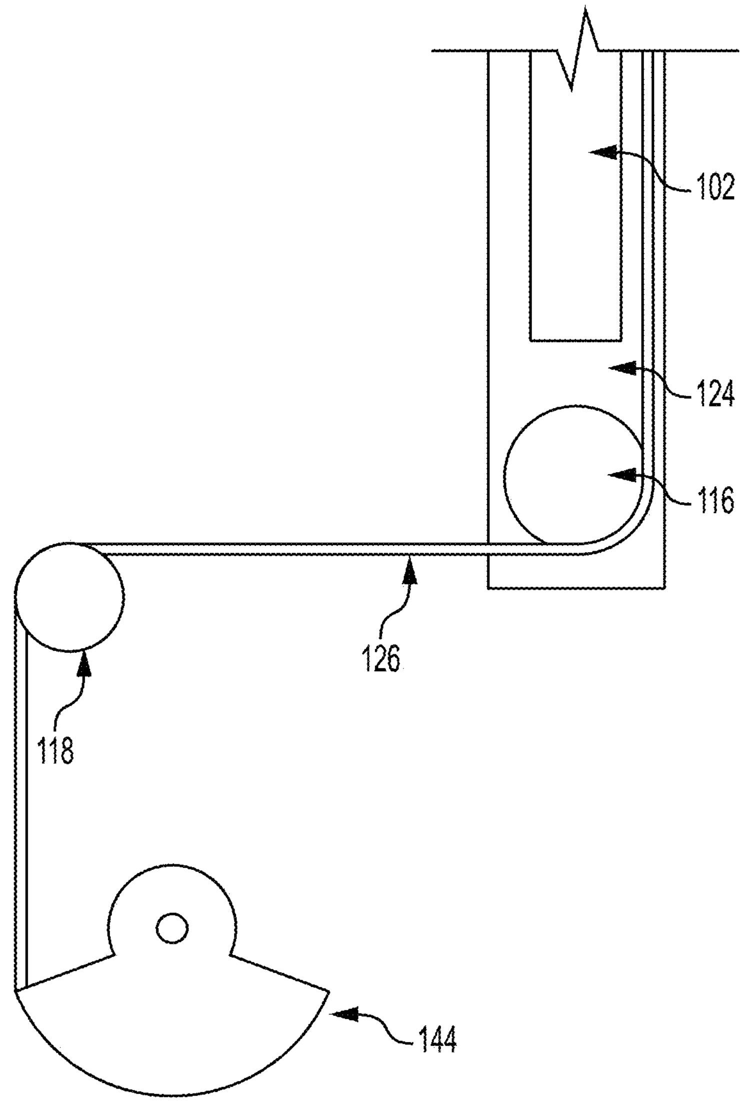
FIG. 2B is close-up schematic view of some components of the emergency autoland braking system of FIG. 1, in an embodiment.

FIG. 2A additionally shows a top perspective simplified schematic view of the force equalizing pulley system utilizing a single actuator for emergency autoland braking system 100 where electromechanical linear actuator 102 is mounted to the baseplate 124. In FIG. 2A, first cam 144 and second cam 145 are represented in a simplified manner in which the rotation of the cams 144, 145 is an alternate plane of orientation. FIG. 2B shows a top perspective simplified schematic view of a portion of emergency autoland braking system 100 with the first cam 144 having the same orientation as that of the other figures. FIGS. 2A and FIG. 2B are best viewed together with the following description. The acting end of the linear actuator 102 is connected to the driven sled 108 via the linear shaft portion 103 of the acting end of the linear actuator 102. Pulley 106 is also affixed to the driven sled 108. The driven sled 108 is attached to the linear bearings 110 which travel in the corresponding linear rails 112, with the direction of travel being the same as the linear actuator's direction of motion during actuation. The travel limiting stops 114 are affixed to the linear rails 112 to prevent over travel conditions. Two cable pulleys 116 are mounted to the baseplate 124, and the two additional cable pulleys 118 are mounted to a rudder pedal assembly 128 as shown in FIG. 1. One end of the cable 126 is attached to the first cam 144. The cable 126 is configured such that it wraps around each pulley 118, pulley 116, and pulley 106, with the other end of the cable 126 terminating at the second cam 145.

Figure 3:
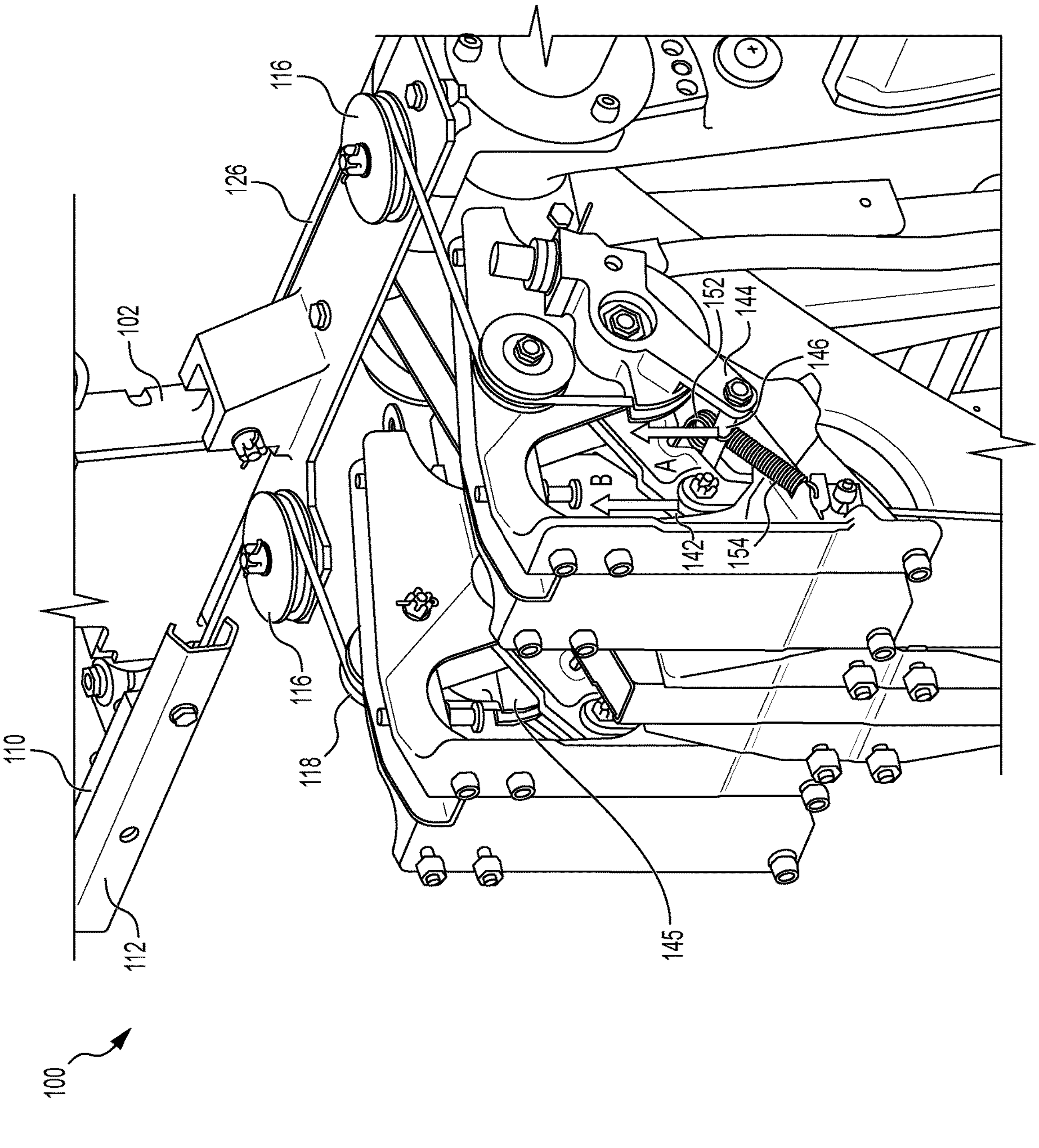
FIG. 3 is a perspective view of the emergency autoland braking system of FIG. 1.

FIG. 3 is a perspective view of emergency autoland braking system 100 showing components mechanically coupled with first cam 144. Second cam 145 includes the same or similar (e.g., mirror image) components out of view on the opposite side of FIG. 3. Rotation of first cam 144 operates the same as second cam 145 and its description is not repeated accordingly.

Figure 4:
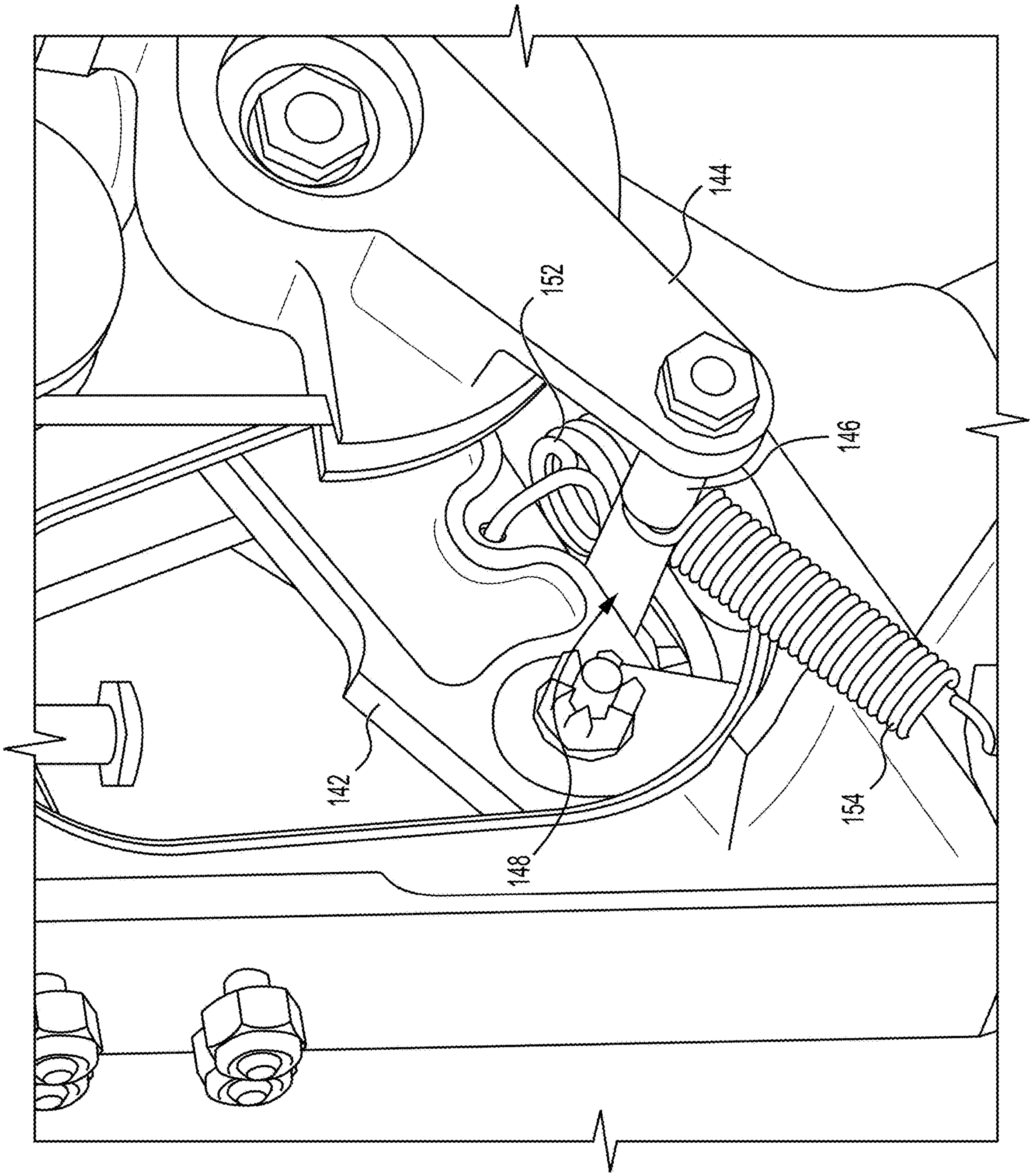
FIG. 4 is a close-up view of a portion of FIG. 3.
Figure 5:
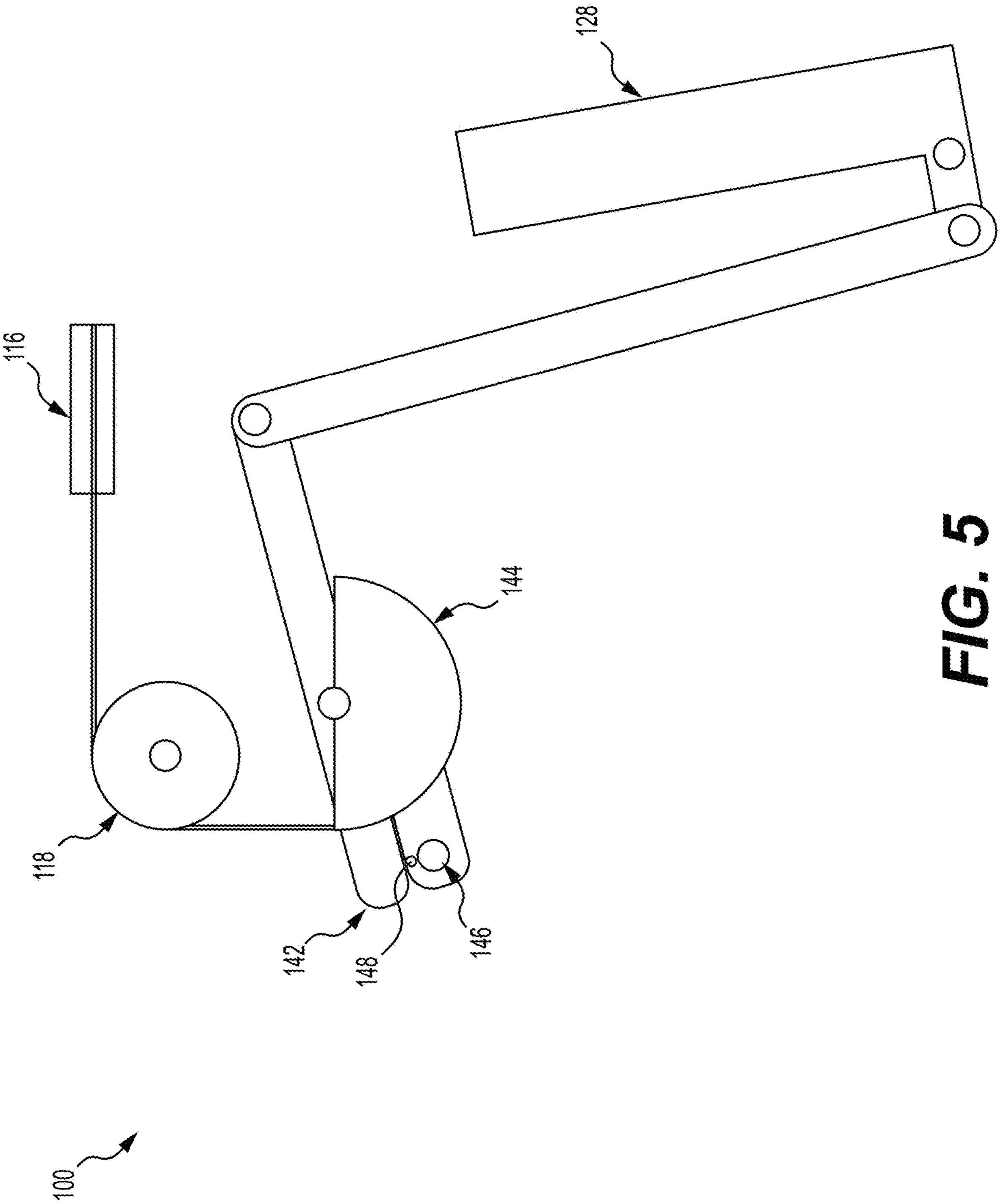
FIG. 5 is a side view showing some components of the emergency autoland braking system of FIG. 1.

FIG. 4 is a close-up view of a portion of FIG. 3. FIG. 5 is a side view showing some components of emergency autoland braking system 100 with other components removed from view for clarity of illustration. FIGS. 3-5 are best viewed together with the following description.

Referring to FIG. 5, a brake arm 142 is operatively coupled to rudder pedal assembly 128, and the brake arm 142 is operatively coupled to a braking system input such that actuation of the brake arm 142 causes application of a braking force. For the autoland braking system 100, brake arm 142 is also configured for actuation via an electromechanical actuator (not shown). As best viewed in FIG. 4, a first spring 152 is configured to bias the brake arm 142 towards a non-braking position such that upon release of a corresponding brake pedal by a pilot or co-pilot, the brake arm 142 is returned to the non-braking position for completely releasing any braking force by the braking mechanism.

Returning to FIG. 3, first cam 144 is operatively coupled to an end of cable 126 such that pulling of cable 126 via linear actuator 102 causes rotation of first cam 144. An extending member 146 is fastened to an outer end of first cam 144. An arrow labeled "A" shown in FIG. 3 indicates the direction of movement of extending member 146 when first cam 144 is rotated by actuation of linear actuator 102 via cable 126. Extending member 146 provides a contact point 148 between first cam 144 and brake arm 142, as best viewed via FIG. 4. Upon actuation of first cam 144, extending member 146 is rotated upwards thereby contacting brake arm 142 at contact point 148 and actuating brake arm 142. Corresponding upwards movement of brake arm 142 is shown with an arrow labeled "B" in FIG. 3. A second spring 154 is configured to bias first cam 144 towards a non-braking position such that upon release of cable 126 via linear actuator 102, first cam 144 is returned to the non-braking position allowing brake arm 142 to be returned to the non-braking position. In embodiments, second spring 154 is mechanically coupled via one end to extending member 146 and via the opposite end to a fixed structure nearby. Second spring 154 provides continual tension on cable 126 when the autobrake system is not actuated. Each cam 144, 145 has contact point 148 between its extending member and brake arm, which allows the brake system to operate normally when the autobrake system 100 is not actuated, and then for the autobrake system 100 to press the brake arm when actuated.

Figure 6:
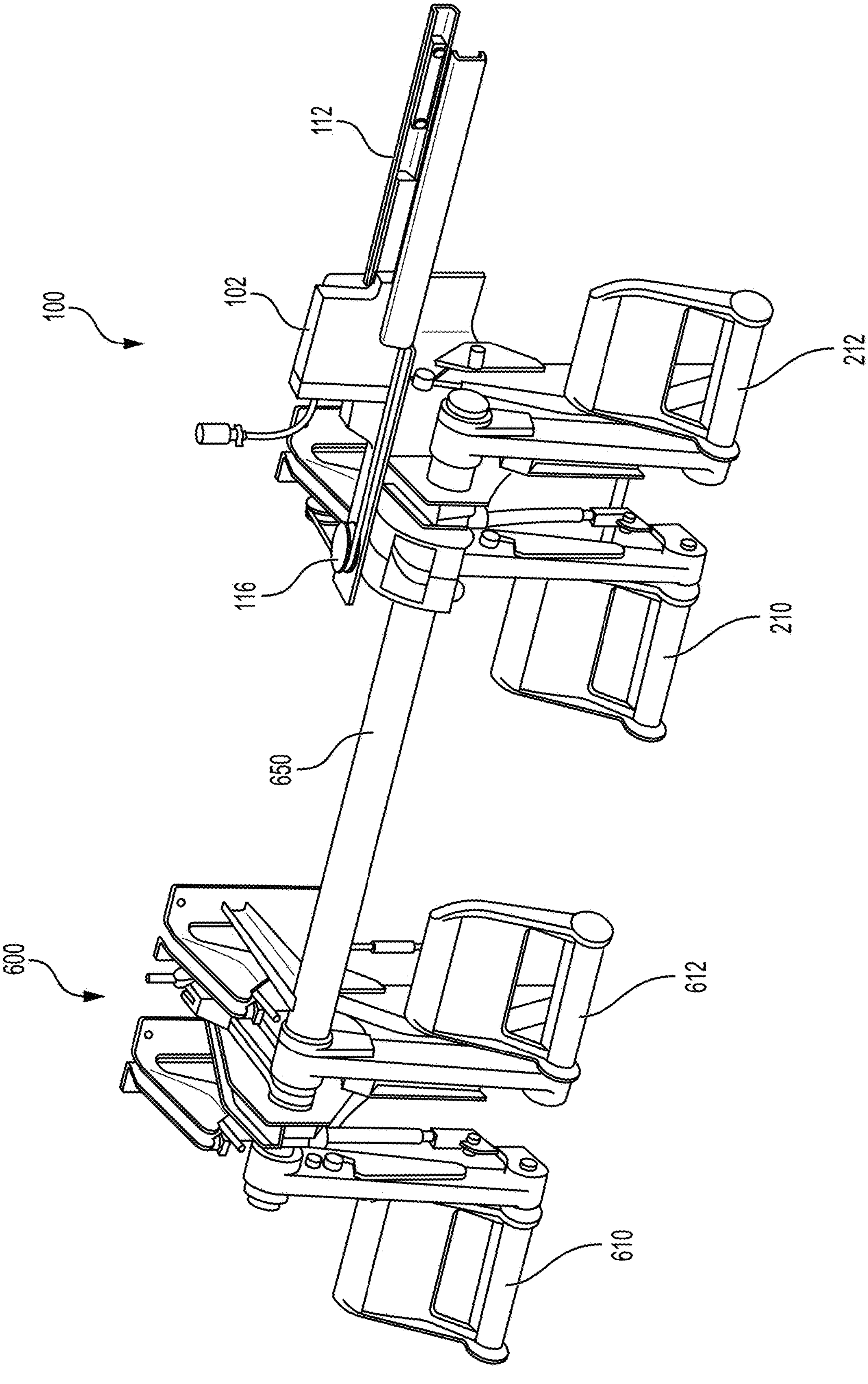
FIG. 6 shows an emergency autoland braking system operatively coupled to a second braking system, in an embodiment.

FIG. 6 shows emergency autoland braking system 100 operatively coupled to a co-pilot's brake pedals 210, 212 via linear actuator 102 for adding autoland capability to the aircraft's braking system. A torque tube 650 is used to couple rudder input between the co-pilot brake pedals 210, 212 and a pilot's brake pedals 610, 612. Alternatively, system 100 may be installed on the pilot's brake pedals 610, 612, without departing from the scope hereof.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An emergency autoland braking system for aircraft, comprising:

a cable having a first end and a second end;

a first cam operatively coupled to the first end of the cable, wherein the first cam is configured to rotate via pulling of the cable thereby actuating a left brake arm;

a second cam operatively coupled to the second end of the cable, wherein the second cam is configured to rotate via pulling of the cable thereby actuating a right brake arm;

a pulley, wherein the cable is routed through the pulley; and a linear actuator operatively coupled to the pulley for adjusting a position of the pulley, wherein actuation of the linear actuator applies equal tension to the first and second ends of the cable via the pulley thereby adding an equal braking force to the left brake arm and the right brake arm.

2. The system of claim 1, comprising a controller configured to provide closed loop operation for applying a proportional braking force via the linear actuator for slowing the aircraft as quickly and safely as possible without skidding.

3. The system of claim 2, wherein control of the proportional braking force via the linear actuator is based on input from one or more of a wheel speed sensor, a longitudinal acceleration sensor, an airspeed sensor, or an altitude sensor.

4. The system of claim 2, wherein the pulley is mounted on a driven sled and the driven sled is operatively coupled to one or more linear rails such that the linear actuator moves a position of the driven sled along the one or more linear rails for adjusting the position of the pulley.

5. The system of claim 4, wherein the driven sled is operatively coupled to the one or more linear rails via one or more linear bearings, respectively.

6. The system of claim 5, further comprising travel limit stops operatively coupled to the one or more linear rails to prevent over travel of the driven sled.

7. The system of claim 1, wherein the first cam and the second cam each comprise an extending member configured to contact the left brake arm and the right brake arm, respectively.

8. The system of claim 1, further comprising a first left spring configured to bias the left brake arm towards a non-braking position such that upon release of a left brake pedal, the left brake arm returns to a non-braking position for releasing any braking force.

9. The system of claim 8, further comprising a second left spring configured to bias the first cam towards a non-braking position.

10. The system of claim 1, further comprising a first right spring configured to bias the right brake arm towards a non-braking position such that upon release of a right brake pedal, the right brake arm returns to a non-braking position for releasing any braking force.

11. The system of claim 10, further comprising a second right spring configured to bias the second cam towards a non-braking position.

* * * * *